Oct. 28, 1952     F. R. JOHNSON     2,615,760
SAFETY DEVICE FOR HYDRAULIC BRAKES
Filed March 28, 1949
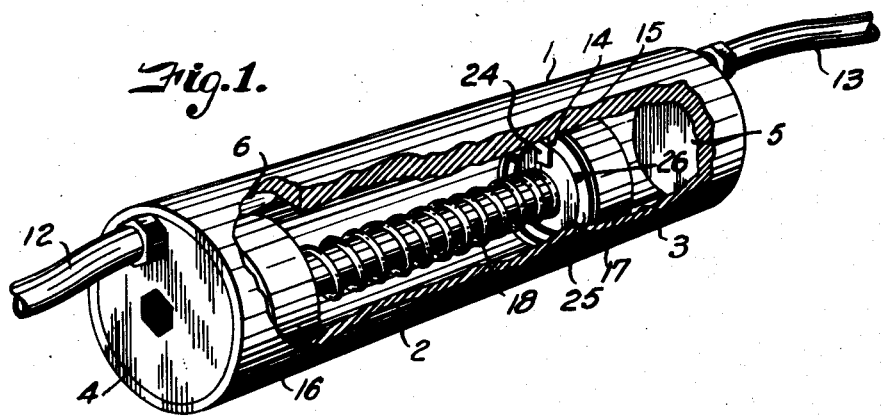
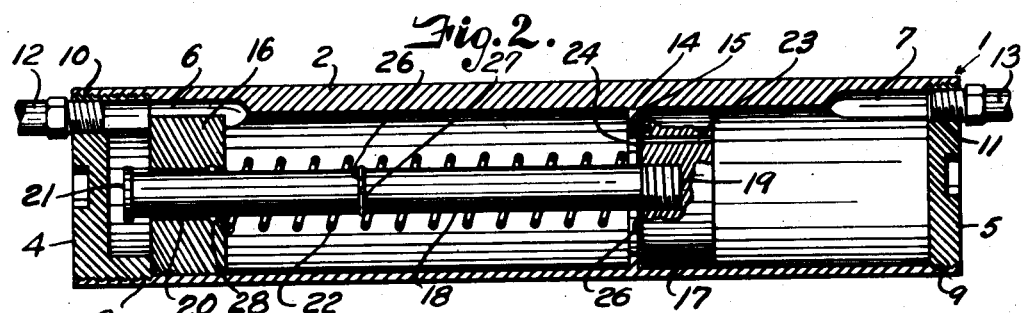
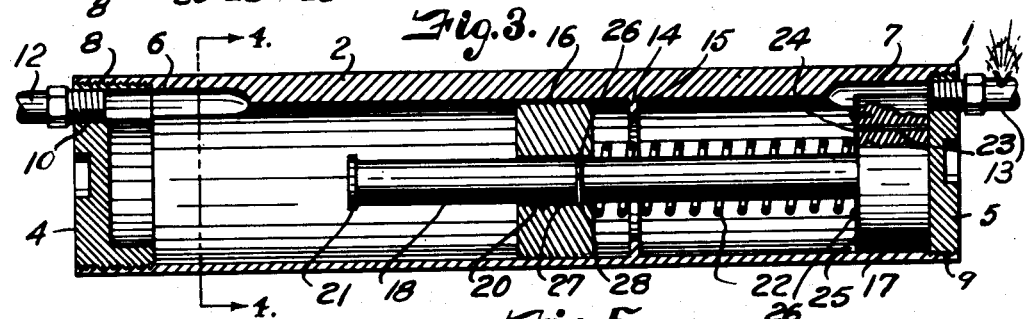
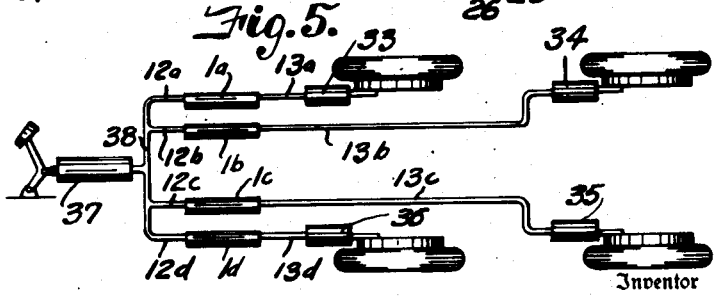
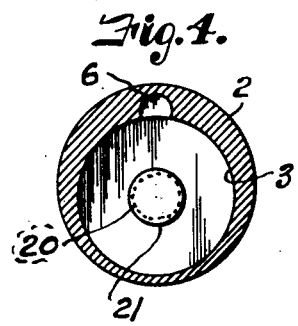
Inventor
Fred R. Johnson
By Fishburn & Mullendore
Attorneys Patented Oct. 28, 1952

2,615,760

UNITED STATES PATENT OFFICE 2,615,760

SAFETY DEVICE FOR HYDRAULIC BRAKES

Fred R. Johnson, Kansas City, Mo.

Application March 28, 1949, Serial No. 83,878

10 Claims. (Cl. 303—84)

This invention relates to hydraulic brake mechanisms wherein a plurality of brakes are manipulated by a common actuator. For example, when brake mechanisms of this character are used on a motor vehicle the actuator, known as the "master cylinder," supplies pressure fluid to the front and rear brake cylinders through branching pipe lines. Consequently, if a leak occurs in any one of the branch lines or brake cylinders served thereby, pressure applied through the master cylinder is exhausted through the leak and none of the brakes are effective in stopping the vehicle.

It is, therefore, the principal object of the present invention to overcome this hazard by providing a separate pressure transmission line to each brake cylinder and to connect such lines with the master cylinder through individual fluid locks whereby should a leak develop in any one or more of the lines or brake cylinders, actuation of the master cylinder automatically closes flow to those lines and the fluid pressure remains effective on the other brake mechanisms.

Other objects of the invention are to provide a line lock that remains full of fluid under operation and which draws its fluid from the master cylinder to provide a line lock that allows for free flow of fluid pressure when the line connected therewith is effective and which automatically operates to shut off the flow in case the line or its brake cylinder should start a leak or become ruptured; to provide a line lock that is readily restored to its original operating position after repair of a leak.

In accomplishing these and other objects of the invention as hereinafter pointed out, I have provided improved structure, the preferred form of which is illustrated in the accompanying drawing, wherein:

Fig. 1 is a perspective view of a hydraulic line lock constructed in accordance with the present invention and showing a side wall of the casing broken away to illustrate the interior parts.

Fig. 2 is an elongated section through the hydraulic line lock showing the pistons in normal working condition when all of the pressure line and brake cylinders served therethrough are in working order.

Fig. 3 is a similar view showing the pistons in position to block flow of hydraulic pressure fluid through a line break.

Fig. 4 is a cross section through the casing on the line 4—4 of Fig. 3.

Fig. 5 is a diagrammatic view showing application of the improved line locks to hydraulic lines leading from the master cylinder to the brake cylinders controlling rotation of the wheels of a motor vehicle.

Referring more in detail to the drawings:

1 designates a hydraulic line lock constructed in accordance with the present invention and which includes a cylindrical casing 2 having a longitudinal bore 3 to provide a piston chamber that is closed at the ends by heads 4 and 5. In the illustrated instance the heads are shown as being externally threaded and engaging within internal threads formed in the ends of the cylinders.

To accommodate inlet and outlet bypass ports 6 and 7 at the respective ends of the cylinder, the bore 3 or piston chamber is offset from the longitudinal axis of the casing to leave sufficient metal at one side to form the ports. The heads 4 and 5, however, are engaged in counterbores 8 and 9 coaxial with the cylindrical exterior of the casing as shown in Figs. 2 and 3. Formed in the heads 4 and 5 in registry with the bypass channels are internally threaded openings 10 and 11 to which is connected the threaded ends of a hydraulic fluid pressure supply and delivery line 12 and 13, respectively, as later described.

Extending inwardly circumferentially of the piston chamber in inset relation with the head 5 is a flange 14 forming a stop shoulder 15 on the side thereof facing the head 5. Mounted in the piston chamber are tandem pistons 16 and 17, the piston 17 being adapted to normally seat against the stop shoulder 15 and to move to the head 5 and the piston 16 to move from a point adjacent the head 4 inwardly of the cylinder upon application of hydraulic pressure in the line 12.

The piston 17 has a rod 18 fixed in a socket 19 thereof in the face adjacent the piston 16 and which extends through a bore 20 and the piston 16 whereby the piston 16 is adapted to slidably move on the piston rod when the piston 17 has reached the end of its stroke under an operating condition as later described. To retain the piston 16 on the rod, the end of the rod is provided with a stop collar 21 that may be removable from the rod to permit application of the piston. The pistons are normally retained in spaced relation by means of a coil spring 22 that is sleeved over the piston rod and has one end engaging against the facing sides of the respective pistons. The pistons are of a depth less than the length of the bypass ports so that when the piston 17 is engaging the shoulder 15 and the piston 16 is moved to its retracted position under action of the spring 21 as shown in Fig. 3, the port 6 bypasses fluid from one side of the piston to the other and when the piston 17 is in position shown in Fig. 3, hydraulic fluid between the pistons is adapted to be discharged through the port 7 upon differential movement of the piston 16 under pressure of the hydraulic fluid as in the case of a leak.

The piston 17 is provided with one or more vent ports 23 that extend therethrough from one side to the other but which are normally closed on the side facing the piston 16 by a spring valve 24 which is shown as part of a ring 25 that is secured to the piston by fastening devices such as screws 26.

Under conditions of operation when the piston moves to the position shown in Fig. 3, it is yieldingly latched to the rod by a split ring 26 that is supported within an annular groove 27 of the rod and which is adapted to spring outwardly into a groove 28 in the bore of the piston 16 when the piston moves thereover in compressing the spring 22. The latch thus retains the piston against action of the spring and prevents return movement thereof into the position shown in Fig. 2 unless the latch is released. The entire unit, of course, might be shifted toward the stop shoulder 15, but when the piston 17 is in engagement with the stop shoulder and the piston 16 in latched position, the piston 16 stops short of the port 6 so that any fluid admitted through the port cannot pass the piston and be lost through a break in the discharge line as later described.

In using hydraulic line locks constructed as described in the braking system of a motor vehicle, individual lines 13a, 13b, 13c and 13d are respectively connected with the brake cylinders 33, 34, 35 and 36 for the respective wheels of the vehicle. The lines are of a length to reach in close proximity to the master cylinder 37 of the braking system, the outlet 38 of which is connected by relatively short lines 12a, 12b, 12c and 12d with the inlet ports 6 of the hydraulic line locks 1a, 1b, 1c and 1d while the lines 13a, 13b, 13c and 13d are connected with the ports 7 thereof as diagrammatically illustrated in Fig. 5.

The pipe lines 13a, 13b, 13c and 13d are filled with liquid by means of a hand pump that is adapted to be connected with the drain openings (not shown) which are provided in the brake lines of all hydraulic systems. The master cylinder is supplied with liquid by pouring it into the supply reservoir therefor. Upon injection of the liquid, the pressure thereon moves the pistons 17 forwardly in their respective cylinders until stopped by the shoulder 15. The space between the pistons 16 and 17 then fills through the ports 23 in the pistons 17. If a piston 16 has been engaged with a latch 27, the pressure of the fluid acting on the inner face of the piston 16 will force the piston 16 out of engagement with the latch and move it along the piston rod to the position exposing the bypass port 6, the pressure of the liquid being supplemented by action of the spring 22. Fluid may be added to the master cylinder to bring the reserve to a proper level.

In operation of the master cylinder 37, fluid is discharged under pressure to the respective locks. The pressure acting through the bypass ports 6 equalizes on the respective sides of the piston 16, however, since the flapper valves 24 are closing the part 23, the pressure is effective in moving the pistons 17 forwardly in their brake cylinders until the collar on the piston rod engages the pistons 16 whereupon the entire piston assemblies move as a unit. As soon as the pistons 16 pass the outlet of the bypass ports 6, fluid is trapped between the pistons and the pressure is effective on the outer face of the piston 16 to move the entire assembly sufficiently to effect application of the respective braking cylinders. Upon release of pressure in the master cylinder 37, return movement of the actuating parts of the brake cylinders will reverse the pressure on the liquid to act on the outer face of the pistons 17 and the inner face of pistons 16 to return the piston assemblies to the position shown in Fig. 2, thereby releasing braking pressure on the wheels.

Assuming that a leak occurs in one of the lines or the brake cylinders 33, 34, 35 or 36 served thereby, operation of the master cylinder effects movement of the piston assemblies as just described, however, the piston 17 of the lock serving the defective line will be unable to build up pressure on the brake cylinder side thereof because the fluid exhausts from the leaking line. Consequently, the piston 17 will move to the end of the cylinder as shown in Fig. 3 exposing the inlet of the bypass port 7. The master cylinder pressure, however, acts on the outer face of the piston 16 to move the piston forwardly on the piston rod compressing the spring 22. The piston 16 moves forwardly in the cylinder since the fluid trapped between the pistons is exhausted through the exposed end of the bypass port 7. The piston therefore moves until the internal groove therein is engaged by the latch 26 whereupon the piston 16 is latched against return movement by the compressed spring 18. Since the piston 16 closes flow between the bypasses 6 and 7, the pressure of the master cylinder is effective on the other three brake cylinders. After application of the brakes through the master cylinder, the piston 16 remains in latched engagement so that should the piston assembly tend to return toward the forward end of the cylinder engagement of the piston 17 with the stop shoulder 15 will prevent the piston 16 from passing the bypass port 6. Therefore, the leaking line remains shut off from the braking system until the leak is repaired. Meantime, the other three cylinders remain in service to permit the motorist to reach a repair shop and have the defective line or cylinder repaired.

After repair refilling of the line with fluid under pressure causes the piston 17 to move into engagement with the shoulder 15 and the flow of pressure fluid through the port 23 unseats the flapper valve 24 and acts on the inner face of the piston 16 to effect release of the latch and return of the piston 16 to its original position as shown in Fig. 2, the movement being supplemented by the stored up action in the spring 21 to assure that the piston passes the bypass port 6.

From the foregoing it is obvious that I have provided a safety device which is of simple construction and which is readily installed within the individual brake lines leading from the master cylinder to the brake cylinders so that should a leak occur in any one of the lines, the safety device for that line will automatically function to shut off that line from the braking system. It is also obvious that the safety device remains full of the hydraulic fluid during normal operation and only that portion of the fluid which is contained within the defective line is lost.

What I claim and desire to secure by Letters Patent is:

1. In combination with a hydraulic braking mechanism including a master cylinder and a plurality of brake cylinders operated thereby and having individual ducts connecting said brake cylinders with the master cylinder, a safety lock in each duct including a casing having a piston chamber provided with an inlet in connection with the master cylinder and an outlet connection with the brake cylinders, tandemally-spaced pistons having movement in the piston chamber upon actuation of the master cylinder and arranged to alternately close flow from the inlet to the outlet when one of the pistons is in position to connect said inlet and outlet with the space between said pistons, and means for latching the piston at the inlet end from return to a position uncovering the inlet when the other piston is in position to connect the outlet with the space between said pistons.

2. In combination with a hydraulic braking mechanism including a master cylinder and a plurality of brake cylinders operated thereby and having individual ducts connecting said brake cylinders with the master cylinder, a safety lock in each duct including a casing having a piston chamber provided with an inlet in connection with the master cylinder and an outlet connection with the brake cylinders, tandemally-spaced pistons having movement in the piston chamber upon actuation of the master cylinder and arranged to alternately close flow from the inlet to the outlet when one of the pistons is in position to connect said inlet and outlet with the space between said pistons, and means for latching the piston at the inlet end from return to a position uncovering the inlet when the other piston is in position to connect the outlet with the space between said pistons, said pistons at the outlet end having a valved port for passing pressure fluid from said outlet into the space between said pistons for releasing said latch means to permit said piston at the inlet end to return to position for opening the inlet to the space between the pistons.

3. In combination with a hydraulic braking mechanism including a master cylinder and a plurality of brake cylinders operated thereby and having individual ducts connecting said brake cylinders with the master cylinder, a safety lock in each duct including a casing having a piston chamber provided with an inlet in connection with the master cylinder and an outlet connection with the brake cylinders, tandemally-spaced pistons having movement in the piston chamber upon actuation of the master cylinder and arranged to alternately close flow from the inlet to the outlet when one of the pistons is in position to connect said inlet and outlet with the space between said pistons, means for latching the piston at the inlet end from return to a position uncovering the inlet when the other piston is in position to connect the outlet with the space between said pistons, said piston at the outlet end having a valved port for passing pressure fluid from said outlet into the space between said pistons for releasing said latch means to permit said piston at the inlet end to return to position for opening the inlet to the space between the pistons, and a spring between the pistons to complete said return movement of the piston at the inlet end.

4. A safety lock including a casing having a piston chamber provided with an inlet adapted to be connected with a master cylinder and an outlet adapted to be connected with a brake cylinder, tandemally-spaced pistons having movement in the piston chamber upon actuation of the master cylinder and arranged to alternately close flow from the inlet to the outlet when a piston is in position to connect said inlet and outlet with the space between said pistons, said piston at the inlet end having movement independently of the piston at the outlet end on pressure drop at said outlet, and means for latching the piston at the inlet end from return to a position uncovering the inlet when the other piston is in position to connect the outlet with the space between said pistons.

5. A safety lock including a casing having a piston chamber provided with an inlet adapted to be connected with a master cylinder and an outlet adapted to be connected with a brake cylinder, tandemally-spaced pistons having movement in the piston chamber upon actuation of the master cylinder and arranged to alternately close flow from the inlet to the outlet when a piston is in position to connect said inlet and outlet with the space between said pistons, and means for latching the piston at the inlet end from return to a position uncovering the inlet when the other piston is in position to connect the outlet with the space between said pistons, said pistons at the outlet end having a valved port for passing pressure fluid from said outlet into the space between said pistons for releasing said latch means to permit said piston at the inlet end to return to position for opening the inlet to the space between the pistons.

6. A safety lock including a casing having a piston chamber provided with an inlet adapted to be connected with a master cylinder and an outlet adapted to be connected with a brake cylinder, tandemally-spaced pistons having movement in the piston chamber upon actuation of the master cylinder and arranged to alternately close flow from the inlet to the outlet when one of the pistons is in position to connect said inlet and outlet with the space between said pistons, means for latching the piston at the inlet end from return to a position uncovering the inlet when the other piston is in position to connect the outlet with the space between said pistons, said piston at the outlet end having a valved port for passing pressure fluid from said outlet into the space between said pistons for releasing said latch means to permit said piston at the inlet end to return to position for opening the inlet to the space between the pistons, and a spring between the pistons to complete said return movement of the piston at the inlet end.

7. A safety lock including a casing having a piston chamber provided with an inlet adapted to be connected with a master cylinder and an outlet adapted to be connected with a brake cylinder, tandem pistons having movement in the piston chamber, a rod fixed to one of the pistons and slidably mounting the other, a spring spacing the pistons apart to effect movement of both pistons upon actuation of the master cylinder to alternately close flow from the inlet to the outlet when a piston is in position to connect said inlet and outlet with the space between said pistons, said piston at said inlet end being movable toward the other when the other piston reaches the limit of its movement, and means for latching the piston at the inlet end to the piston rod against action of said spring to prevent return to a position uncovering the inlet when the other piston is in position to connect the outlet with the space between said pistons.

8. A safety lock including a casing having a piston chamber provided with an inlet adapted to be connected with a master cylinder and an outlet adapted to be connected with a brake cylinder, tandemally-spaced pistons having movement in the piston chamber upon actuation of the master cylinder and arranged to alternately close flow from the inlet to the outlet when a piston is in position to connect said inlet and outlet with the space between said pistons, one of said pistons having a rod slidably mounting the other piston, a coil spring sleeved on the rod to space said piston, and means for latching the rod with the slidably mounted piston to prevent return to a position uncovering the inlet when the other piston is in position to connect the outlet with the space between said pistons, said piston at the outlet end having a valved port for passing pressure fluid from said outlet into the space between said pistons for releasing said latch means to permit the coil spring to return said piston at the inlet end to return to position for opening the inlet to the space between the pistons.

9. A safety device for hydraulic brake systems including a casing having a piston chamber provided with an inlet at one end adapted to be connected with a master cylinder and an outlet at the other end adapted to be connected with a brake cylinder of said system, a pair of pistons slidable in tandem relation in the cylinder with one piston being movable relatively to the other, means interconnecting the pistons, a spring yieldably retaining the pistons in spaced relation on said interconnecting means, said inlet having connection with the space between the pistons when the pistons are shifted to the inlet end whereby pressure fluid admitted through the inlet acts on the piston nearest the outlet end to move the piston at the inlet end by said interconnecting means until the piston at the inlet end closes connection of the inlet with the space between the pistons and render the pressure fluid effective on the piston at the inlet end to effect movement of both pistons for transmitting pressure of the master cylinder on the fluid in the brake cylinder and in the absence of brake cylinder fluid to move the piston at the outlet end into stop engagement with the end of the chamber, said outlet having connection with the space between the pistons when the piston at the outlet end reaches said stop engagement to release fluid that is trapped between the pistons and effect displacement thereof under continued movement of the piston nearest the inlet end against action of the spring, and latch means engageable with a part of the piston at said inlet end to retain said piston and prevent return of the piston to the first mentioned position where the inlet connects with the space between the pistons.

10. A safety lock of the character described including a casing having a piston chamber and having an inlet and an outlet at the respective ends of the piston chamber for admitting and discharging a pressure fluid, a stop in the piston chamber intermediate the inlet and outlet, a piston closing flow of pressure fluid to said outlet and engaging said stop but adapted to move from said stop in the direction of said outlet for establishing flow through said outlet, a second piston in the piston chamber adapted to pass pressure fluid from the inlet and movable in response to said pressure fluid into a position for closing flow of pressure fluid when the first piston is in position for establishing flow through the outlet, said first piston being movable responsive to movement of the second piston, means resiliently interconnecting said pistons to permit further movement of said second piston when the first piston reaches its last named position, and means for latching the pistons together to prevent complete return of the second piston to its first position when the first piston re-engages said stop.

FRED R. JOHNSON.

REFERENCES CITED

The following references are of record in the file of this patent:

UNITED STATES PATENTS

| Number | Name | Date |
|---|---|---|
| 1,905,077 | Walker | Apr. 25, 1933 |
| 2,008,393 | Hess | July 16, 1935 |